(12) United States Patent
Ma

(10) Patent No.: US 8,292,366 B2
(45) Date of Patent: Oct. 23, 2012

(54) FOLD-AND-DIVE SEAT

(75) Inventor: Chae Hoon Ma, Whasung-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 435 days.

(21) Appl. No.: 12/621,084

(22) Filed: Nov. 18, 2009

(65) Prior Publication Data

US 2011/0049958 A1 Mar. 3, 2011

(30) Foreign Application Priority Data

Aug. 31, 2009 (KR) .......................... 10-2009-0081337

(51) Int. Cl.
*B60N 2/12* (2006.01)

(52) U.S. Cl. ..................................... 297/341; 297/378.1

(58) Field of Classification Search .................. 297/341, 297/378.1
See application file for complete search history.

(56) References Cited

U.S. PATENT DOCUMENTS

| | | | |
|---|---|---|---|
| 6,629,730 B2 | 10/2003 | Makosa | |
| 7,226,128 B2 * | 6/2007 | Spies et al. ................. | 297/341 |
| 7,562,926 B2 * | 7/2009 | Kojima ......................... | 297/341 |
| 2004/0251705 A1 | 12/2004 | Tame et al. | |
| 2006/0061175 A1 * | 3/2006 | Beneker et al. ........... | 297/341 X |
| 2008/0122280 A1 * | 5/2008 | Jaranson et al. .......... | 297/341 X |

FOREIGN PATENT DOCUMENTS

| | | |
|---|---|---|
| JP | 2005-53240 A | 3/2005 |
| JP | 2005-53246 A | 3/2005 |
| KR | 10-0610841 B1 | 8/2006 |
| KR | 10-0679496 B1 | 1/2007 |
| KR | 10-2007-0031493 A | 3/2007 |

* cited by examiner

*Primary Examiner* — Anthony D Barfield
(74) *Attorney, Agent, or Firm* — Morgan, Lewis & Bockius LLP

(57) ABSTRACT

A fold-and-dive seat may include a first link bracket, one end of which is pivotally connected to a back frame and the other end of which is pivotally connected to a cushion frame, wherein the one end of the first link bracket is spaced from a folding pivot shaft of the back frame, a second link bracket, one end of which is pivotally connected to a leading end of the cushion frame, and the other end of which is selectively engaged to an upper guide, wherein the upper guide pivotally coupled to the back frame by the folding pivot shaft is slidably coupled to a lower guide fixed to a vehicle body and configured to move along the lower guide, and a locking device selectively holding the second link bracket by engaging the second link bracket to the upper guide so as not to rotate the second link bracket such that the leading end of the cushion frame is not moved downwards.

3 Claims, 5 Drawing Sheets

(a)

(b)

(a)

(b)

FOLD-AND-DIVE SEAT

CROSS REFERENCE TO RELATED APPLICATION

The present application claims priority to Korean Patent Application Number 10-2009-0081337 filed on Aug. 31, 2009, the entire contents of which application is incorporated herein for all purposes by this reference.

BACKGROUND OF THE INVENTION

1. Field of the Invention

The present invention relates to a fold-and-dive seat, in particular, to one which is designed to be folded in a specific position in order to prevent the seat back from interfering with the front seat when the seat back is folded into the state where the fold-and-dive seat can be slid toward the front seat.

2. Description of Related Art

In general, a vehicle seat not only serves as a seat on which an occupant rests but also has a variety of convenience functions such as a cargo function that allows for increased cargo space, a walk-in function for facilitating third-row passengers to get in and out of a vehicle, a two- or three-row full-flat function. Nowadays, more complex functions are being added to the vehicle seat as convenience functions. One of the convenience functions is the fold-and-dive function. A vehicle seat having the fold-and-dive function (hereinafter, referred to as a fold-and-dive seat) is configured such that the seat cushion is moved forwards and downwards in response to folding the seat back toward the seat cushion so that the space above the folded seat can be used for cargo.

Below, a description will be given of a conventional fold-and-dive seat with reference to the accompanying drawings.

FIGS. 1A and 1B are side elevation views illustrating operations of the conventional fold-and-dive seat.

The conventional fold-and-dive seat 10 is designed to slide forwards and backwards. The conventional fold-and-dive seat 10 can be folded irrespective of positions to which it is slid. Since the seat 10 is folded even in the state where it is slid toward a front seat 20, a seat back 11 and a seat cushion 12 of the seat 10 interfere with the front seat 20. Accordingly, the seat 10 has to be slid backwards before being folded, thereby decreasing efficiency.

In addition, as shown in FIG. 1B, even if the fold-and-dive seat 10 is folded without interfering with the front seat 20 since the seat 10 is slid to a position adjacent to the front seat 20 where the seat 10 does not interfere with the front seat 20 while being folded, an interval x still exists between the folded seat 10 and a folded rear seat 30. Accordingly, when cargo is loaded onto the back of the folded seats 10 and 30, it may drop through the interval.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention provide a fold-and-dive seat which has a locking device in order to allow for the fold-and-dive operation of the seat back in a specific position.

In an aspect of the present invention, the fold-and-dive seat may include a first link bracket, one end of which is pivotally connected to a back frame and the other end of which is pivotally connected to a cushion frame, wherein the one end of the first link bracket is spaced from a folding pivot shaft of the back frame, a second link bracket, one end of which is pivotally connected to a leading end of the cushion frame, and the other end of which is selectively engaged to an upper guide, wherein the upper guide pivotally coupled to the back frame by the folding pivot shaft is slidably coupled to a lower guide fixed to a vehicle body and configured to move along the lower guide, and a locking device selectively holding the second link bracket by engaging the second link bracket to the upper guide so as not to rotate the second link bracket such that the leading end of the cushion frame is not moved downwards.

The locking device may include a stopper fixed to the lower guide and protruding upwards in a predetermined length, a holder pivotally coupled to the upper guide, wherein the other end of the second link bracket is selectively caught and held by one end of the holder, an elastic member applying an elastic force to the holder so that the one end of the holder is pivotally biased to lock the other end of the second link bracket to the one end of the holder, and a fixed bracket connected to the upper guide and pivotally coupled to the second link bracket, wherein the holder is rotated by the stopper in a direction that the one end of the holder releases the second link bracket when the other end of the holder comes into contact with the stopper.

The second link bracket may have a stepped portion on the other end thereof and the holder has a corresponding stepped portion on the one end thereof, such that the second link bracket is caught and held by the holder when the stepped protrusion of the second link bracket is caught by the stepped protrusion of the holder by the elastic force of the elastic member.

The other end of the holder may have a rounded inclined surface on a lower portion thereof, which selectively comes into contact with the stopper when the upper guide moves along the lower guide in a predetermined distance.

According to various aspects of the present invention, the fold-and-dive operation is enabled only if the fold-and-dive seat maintains a proper interval from the front- and rear-row seats. In addition, the efficiency of an operation is enhanced by preventing the vehicle seat from interfering with the front-row seat.

Furthermore, cargos can be stably loaded on the folded seats since there is no interval between the fold-and-dive seat and the rear-row seat.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1A:
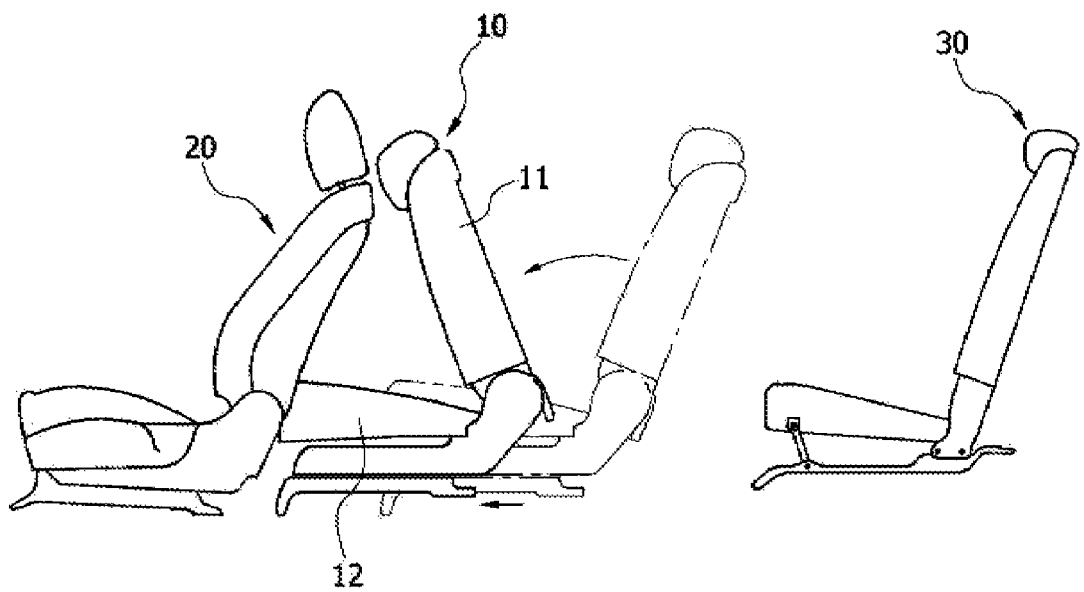
FIGS. 1A and 1B are side elevation views illustrating operations of a conventional fold-and-dive seat.
Figure 1B:
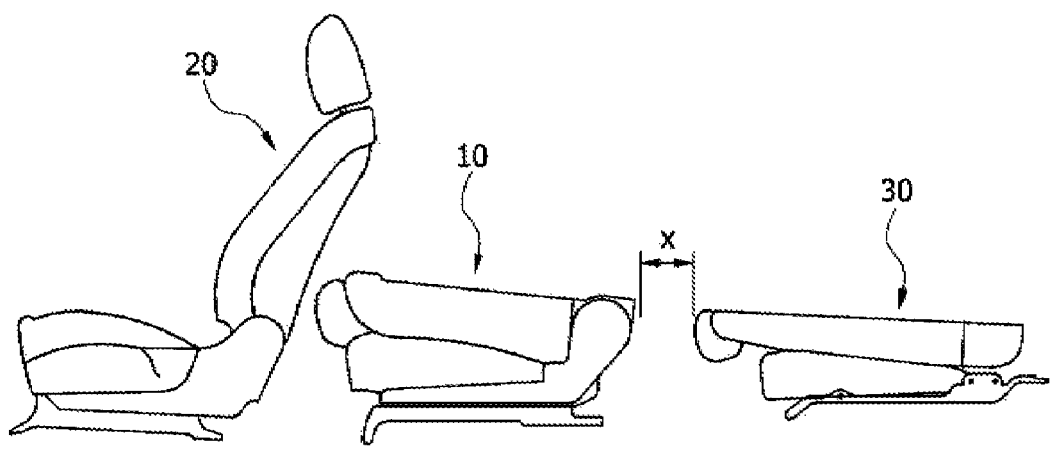

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
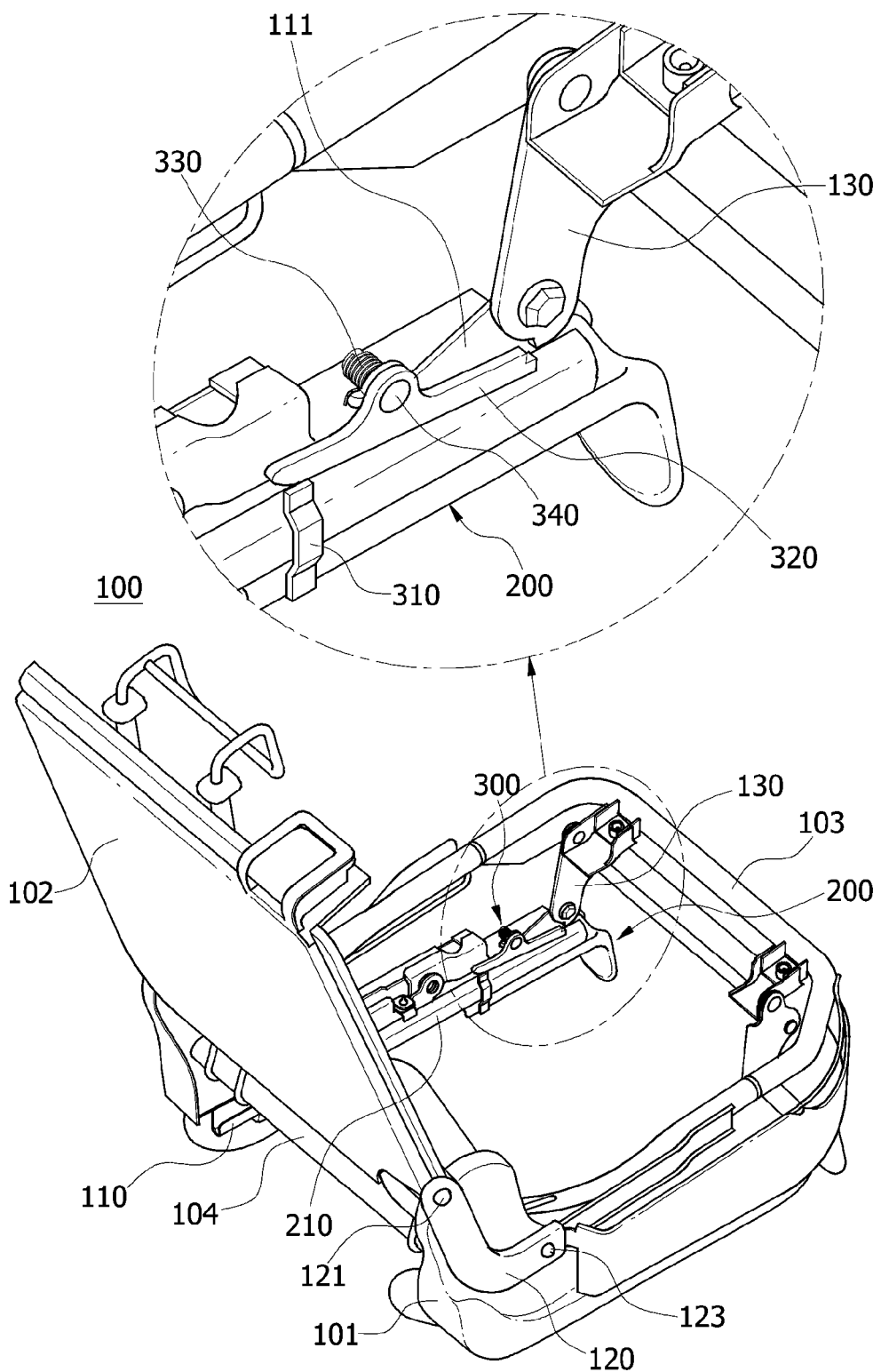
FIG. 2 is a perspective view illustrating a fold-and-dive seat in accordance with an exemplary embodiment of the invention.
Figure 3:
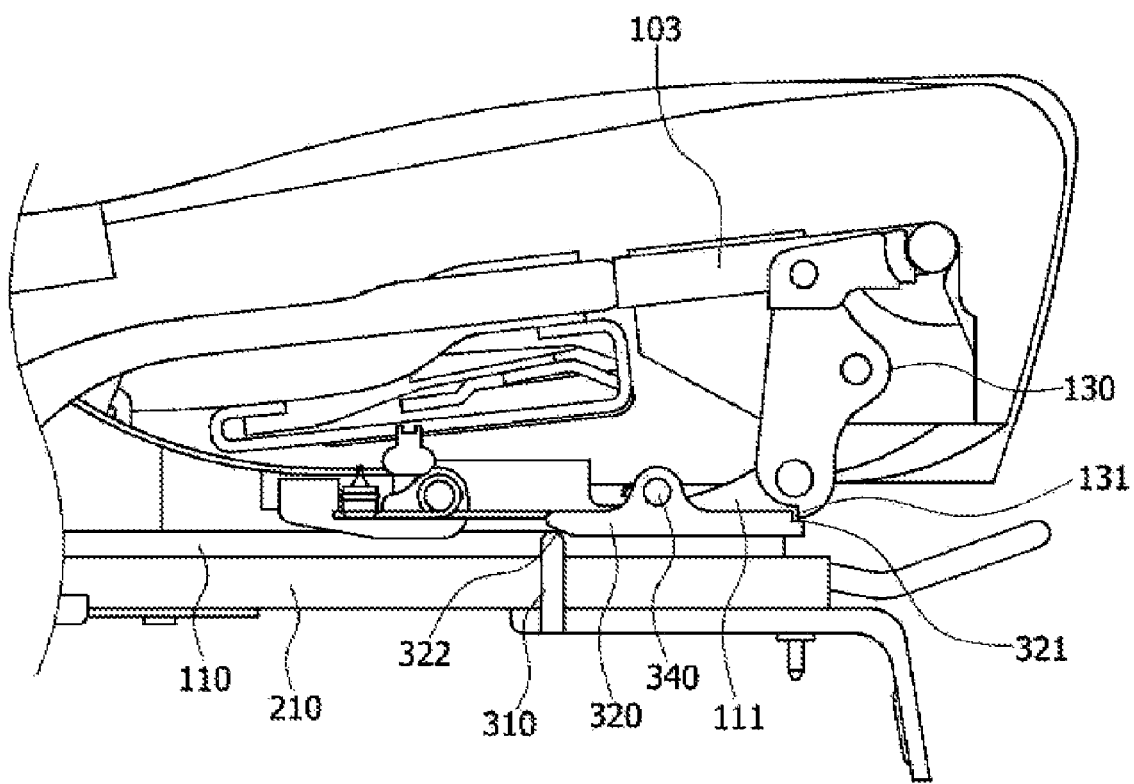
FIG. 3 is a partial cross-sectional view of the fold-and-dive seat shown in FIG. 2.
Figure 4:
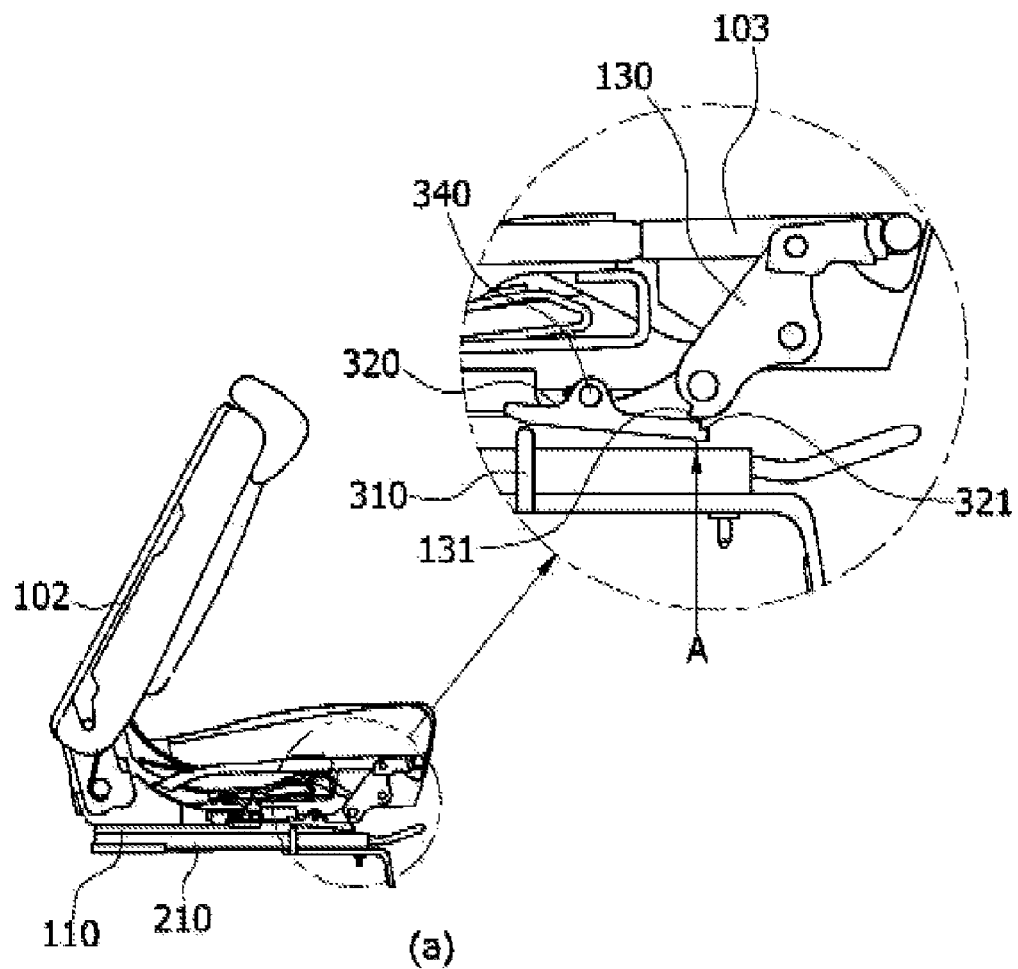
FIG. 4A is a side cross-sectional view illustrating a folded state of the fold-and-dive seat shown in FIG. 2.
FIG. 4B is a side cross-sectional view illustrating a dived state of the fold-and-dive seat shown in FIG. 2.
Figure 4:
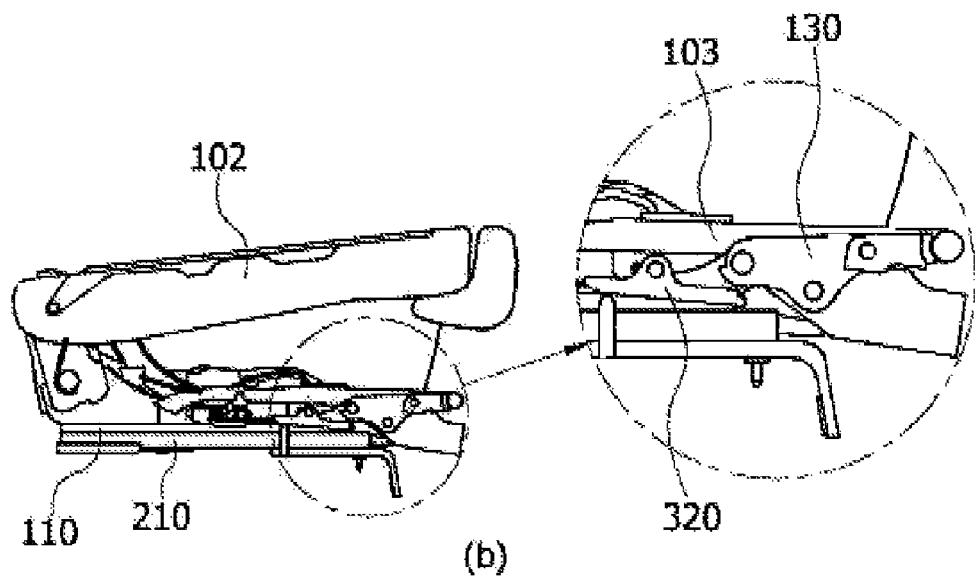
Figure 5:
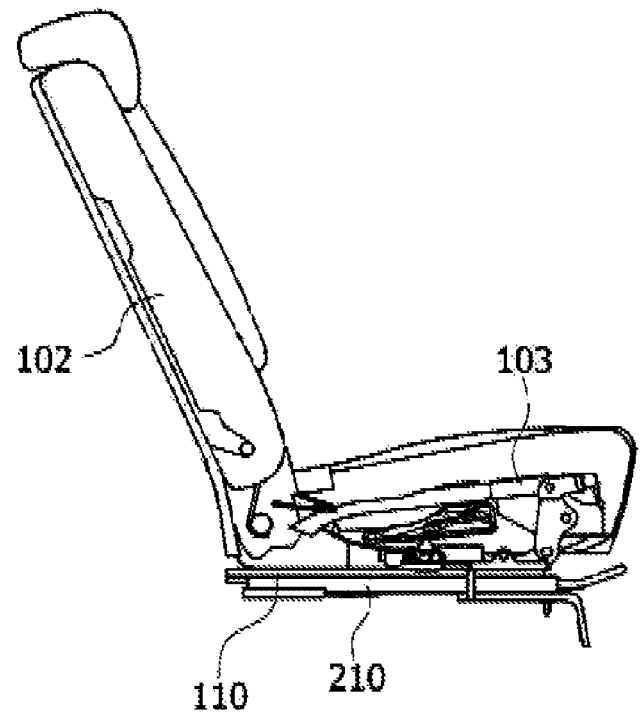
FIGS. 5A and 5B are side cross-sectional views illustrating sliding states of the fold-and-dive seat shown in FIG. 2.
Figure 5:
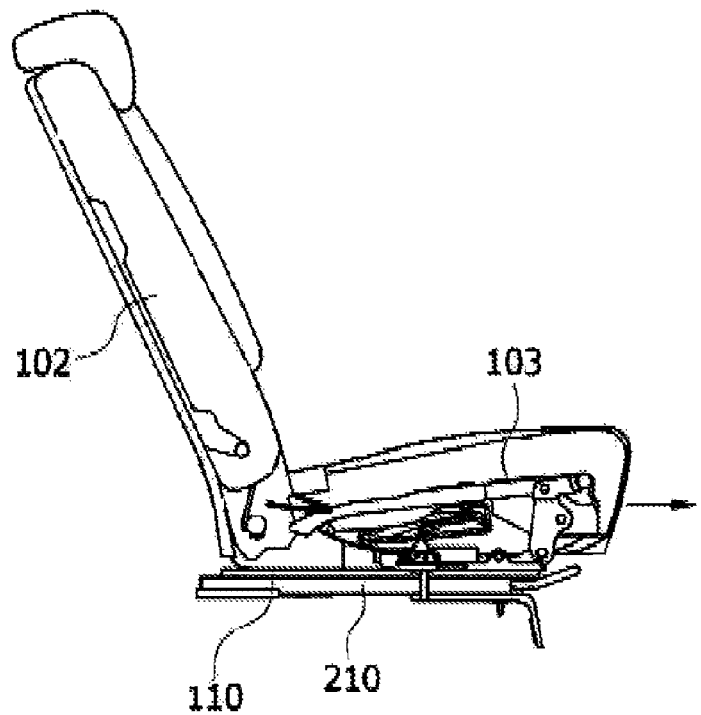

FIG. 2 is a perspective view illustrating a fold-and-dive seat in accordance with an exemplary embodiment of the invention, FIG. 3 is a partial cross-sectional view of the fold-and-dive seat shown in FIG. 2, FIG. 4A is a side cross-sectional view illustrating a folded state of the fold-and-dive seat shown in FIG. 2, FIG. 4B is a side cross-sectional view illustrating a dived state of the fold-and-dive seat shown in FIG. 2, and FIGS. 5A and 5B are side cross-sectional views illustrating sliding states of the fold-and-dive seat shown in FIG. 2.

The fold-and-dive seat 100 in accordance with an exemplary embodiment of the invention has a locking device 300 in the lower part of the seat 100. The locking device 300 disables the fold-and-dive operation of the seat 100 when the seat 100 is slid toward the front row seat (not shown).

The seat 100 includes a back frame 102 provided inside the seat back and a cushion frame 103 provided inside the seat cushion oriented perpendicular to the seat back. The seat 100 is slidably mounted on a leg 200 fixed to a vehicle body. For this purpose, a lower guide 210 is fixed to the leg 200 and an upper guide 110 fixed to the bottom of the seat 100 is slidably mounted on the lower guide 210.

In addition, a main frame 101 is pivotally coupled with the back frame 102 and is fixed to the upper guide 110. The back frame 102 is coupled to the main frame 101 by a pivot shaft 104 so as to rotate and fold about the pivot shaft 104.

The cushion frame 103 is connected to the back frame 102 by a first link bracket 120, which is hinge-coupled to both the back frame 102 and the cushion frame 103.

The cushion frame 103 is also connected to the upper guide 110 by a second link bracket 130, which is hinge-coupled to both the cushion frame 103 and the upper guide 110.

With this configuration, when the back frame 102 pivots about the pivot shaft 104, the cushion frame 103 is dived downwards by the second connecting bracket 130 while being moved forwards by the first link bracket 120.

A first hinge shaft 121 on the upper end of the first link bracket 120, coupled to the back frame 102, is located above the pivot shaft 104 and a second hinge shaft 123 on the lower end of the first link bracket 120 is coupled to the cushion frame 103. As a result, when the back frame 102 is folded, the first link bracket 120 is moved forwards and the cushion frame 103 connected to the first link bracket 120 is also moved forwards.

This configuration allows to fold the back frame 102 and to dive the cushion frame 103 by combined actions of the first and second link brackets 120 and 130. Since the seat cannot be folded and dived if only one of the first and second link brackets 120 and 130 is fixed so as not to rotate, the locking device 300 in accordance with an exemplary embodiment of the invention serves to catch and hold the second link bracket 130, thereby disabling the fold-and-dive operation of the seat.

The locking device 300 includes a stopper 310, a holder 320, and an elastic member 330. The stopper 310 is fixed to the leg 200, the holder 320 is rotated by the stopper 310 to catch and hold the second link bracket 130. The elastic member 330 controls the rotation of the holder 320, and applies an elastic force to the holder 320 so that the holder 320 catches the second link bracket 130.

The stopper 310 is formed to protrude upwards from one outer surface of the lower guide 210 in accordance with an exemplary embodiment of the invention. However, as an alternative, the stopper 310 can be formed to protrude downwards from the lower guide 210, fixed to the lower guide 210.

The stopper 310 comes into contact with a specific position of the holder 320 to rotate the holder 320. The specific position is a position where the seat 100 can be folded and dived. As described above, when the upper guide 110 is located at a slide-starting point A, one end of the holder 320 is rotated by the stopper 310 so as to be released from the second link bracket 130.

The slide starting point A is the point where the leading end of the upper guide 110 is located most remote from the leading end of the lower guide 210, in the direction toward the rear end of the lower guide 210, in the state where the upper guide 110 is mounted on the lower guide 210.

On the slide starting point A, the seat 100 neither interferes with the front rear seat during the fold-and-dive operation nor has an interval from the rear row seat (not shown) after the fold-and-dive operation. In the state where the upper guide 110 is located at the slide starting point A, it can be moved only toward the leading end of the lower guide 210.

The slide starting point A can be varied according to the type of the seat 100, which is differently equipped according to vehicles.

The holder 320 is formed to have a predetermined length along the slide direction (i.e., the longitudinal direction of the upper and lower guides), and is located on the leading end of the upper guide 110. The holder 320 is coupled pivotally to a fixed bracket 111 by the pivot shaft 340.

When one end of the holder 320 is rotated about the pivot shaft 340, brought into contact with the stopper 310, the other end of the holder 320 is released from the second link bracket 130. When one end of the holder 320 is not in contact with the stopper 310, the other end of the holder 320 catches and holds the second link bracket 130 so that the second link bracket 130 does not rotate.

In this case, the other end of the holder 320 can catch and hold the second link bracket 130 since the elastic member 330 applies an elastic force to the holder 320 in the direction that the other end of the holder 320 is rotated toward the second link bracket 130. The elastic member 330 allows the holder 320 to maintain catching and holding the second link bracket 130.

The elastic member 330 can preferably be implemented with a torsion spring. The pivot shaft 340 is fitted into a coil of the torsion spring, one end of the coil is fixed to the pivot shaft 340, and the other end of the coil is supported by the fixed bracket 111.

A downward-facing inclined surface 322 is formed on one end of the holder 320, which comes into contact with the stopper. When one end of the holder 320 comes into contact with the stopper, the downward-facing inclined surface 322 prevents one end of the holder 320 from being caught by the stopper 310, thereby preventing the stopper 310 and the holder 320 from being abraded.

In addition, the holder 320 has a stepped protrusion 321 on the other end thereof, which does not come into contact with the stopper 310. The second link bracket 130 also has a stepped protrusion on one end thereof. Accordingly, when the stepped protrusion 131 of the second link bracket 130 is caught by the stepped protrusion 321 of the holder 320, the second link bracket 130 is held by the holder 320. The second link bracket 130 having the stepped protrusion 131 is linked to the fixed bracket 111 at one end and to the cushion frame 103 at the other end.

Accordingly, if one end of the holder 320 is not in contact with the stopper 310, the other end of the holder 320 presses the second link bracket 130 so that the stepped protrusion 131 of the second link bracket 130 can maintain the state caught by the stepped protrusion 321 of the holder 320.

With this configuration, when the upper guide 110 is located at the slide starting point A, the holder 320 is rotated by the stopper 310, in the direction that the holder 320 releases the second link bracket 130, so that the second link bracket 130 can rotate. This, as a result, enables the fold-and-dive operation of the seat 100.

In addition, when the upper guide 110 is beyond the slide starting point A, the stepped protrusion 131 of the second link bracket 130 is caught by the stepped protrusion 321 of the holder 320 so that the second link bracket 130 is held by the holder 320. As a result, the second bracket 130 cannot rotate and thus the fold-and-dive operation of the seat 100 is disabled.

Since the fold-and-dive operation of the seat 100 is enabled only in the designated point, the seat 100 neither interferes with the front row seat during the fold-and-dive operation nor has an interval from the rear row seat after the fold-and-dive operation.

For convenience in explanation and accurate definition in the appended claims, the terms "upper" and "lower" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A fold-and-dive seat comprising:
   a first link bracket, one end of which is pivotally connected to a back frame and the other end of which is pivotally connected to a cushion frame, wherein the one end of the first link bracket is spaced from a folding pivot shaft of the back frame,
   a second link bracket, one end of which is pivotally connected to a leading end of the cushion frame, and the other end of which is selectively engaged to an upper guide, wherein the upper guide pivotally coupled to the back frame by the folding pivot shaft is slidably coupled to a lower guide fixed to a vehicle body and configured to move along the lower guide; and
   a locking device selectively holding the second link bracket by engaging the second link bracket to the upper guide so as not to rotate the second link bracket such that the leading end of the cushion frame is not moved downwards,
   wherein the locking device comprises:
   a stopper fixed to the lower guide and protruding upwards in a predetermined length;
   a holder pivotally coupled to the upper guide, wherein the other end of the second link bracket is selectively caught and held by one end of the holder;
   an elastic member applying an elastic force to the holder so that the one end of the holder is pivotally biased to lock the other end of the second link bracket to the one end of the holder; and
   a fixed bracket connected to the upper guide and pivotally coupled to the second link bracket,
   wherein the holder is rotated by the stopper in a direction that the one end of the holder releases the second link bracket when the other end of the holder comes into contact with the stopper.

2. The fold-and-dive seat in accordance with claim 1, wherein the second link bracket has a stepped portion on the other end thereof and the holder has a corresponding stepped portion on the one end thereof, such that the second link bracket is caught and held by the holder when the stepped protrusion of the second link bracket is caught by the stepped protrusion of the holder by the elastic force of the elastic member.

3. The fold-and-dive seat in accordance with claim 1, wherein the other end of the holder has a rounded inclined surface on a lower portion thereof, which selectively comes into contact with the stopper when the upper guide moves along the lower guide in a predetermined distance.

* * * * *